Aug. 16, 1938.   R. W. MYERS   2,126,799
VALVE
Filed April 5, 1937

Inventor:
Roy William Myers
by Fraase and Bishop
Attorneys

Patented Aug. 16, 1938

2,126,799

UNITED STATES PATENT OFFICE 2,126,799

VALVE

Roy William Myers, Dennison, Ohio

Application April 5, 1937, Serial No. 134,954

4 Claims. (Cl. 123—188)

My invention relates particularly to valves of the laminated type and has for its object to improve the construction of the same.

The purpose in making valves laminated is, to cushion them against shock, reduce noise of operation and make them seat tightly regardless of slight irregularities in the contacting surfaces, and at the same time resist and hold higher pressures.

In the attempt to secure these qualities in valves, there has never been, so far as I am aware, a successful application of laminated valves. Failure to do so, I believe, has been in faulty construction of the device.

My invention has for its specific object, to produce a valve of the laminated type, in which the laminae are split collars, with means of clamping same together, forming a valving surface, which will be slightly resilient.

Figure 1:
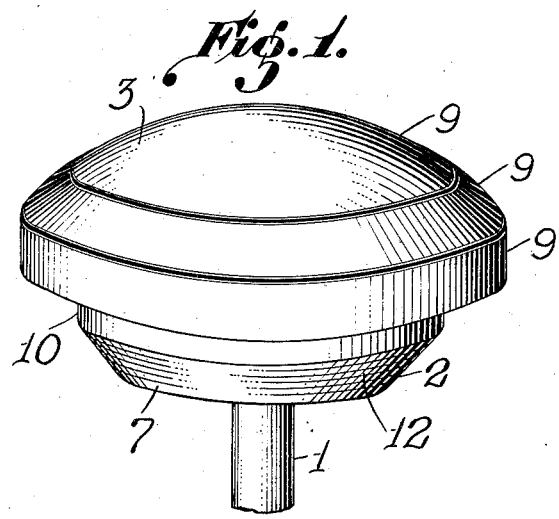
Figure 2:
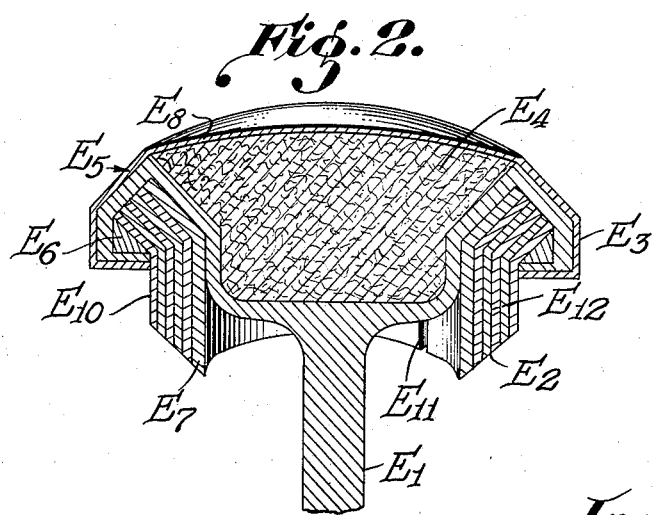

The various features of novelty whereby my invention is characterized will hereinafter be pointed out with particularization in the claim; but for full understanding of my invention and its objects and advantages, reference may be had to the following detailed description taken in connection with the accompanying drawing, wherein:

Figure 1 is a side elevation of a valve arranged in accordance with the present invention; and, Figure 2 is an axial section through the valve.

Referring to the drawing, E1 in Figure 2 represents the valve stem of common design; E5 in Figure 2 represents the valve head in general; E12 in Figure 2 represents the laminae composed of split collars flared at the top and fitted tightly together so as to be compact and air tight. In Figure 2, E2 represents the valving surface formed by the laminae, the inclination of which can be varied as desired. As illustrated the laminae are six split collars, but it is desired to be understood that the laminae may be made up of any number of split collars within the limits of practical limitation. Attention is called to Figure 2, E7 representing the inside reinforcing collar which may not form a part of the valving surface, but act as a reinforcement to the rest of the laminae E12. This reinforcing collar E7 may be thicker than the rest of the laminae E12, as indicated in Fig. 2 of the drawing, so as to more efficiently reinforce the remaining laminae. In Figure 2, E6 represents the retainer ring holding laminae in place after head E5 has been pressed down over same. In Figure 2, E3 represents the cap which retains the heat resistant in space E4. This space E4 may be filled with any suitable and well known heat resistant material such as asbestos filling, which is thus retained in the space E4 by the cap E3. In Figure 2, E8 represents the thickness of the cap which may vary according to size of valve; in Figure 2, E10 represents the outside split collar which forms part of the valving surface E2; in Figure 2, E11 represents the split in laminae E7 running the full length of the laminae—all laminae are split in the same manner so as to make the laminae more resilient at the valving surface. In Figure 1, 1 represents the valve stem of common design. In Figure 1, 9 represents the contour of cap 3 which forms the stream lining of the valve and also the periphery of the valve and at the same time retains the heat resistant. The top of the cap 3 is convexed as shown at 3 in Fig. 1, thus producing what I term a "streamlining" of the valve. In Figure 1, 10 represents the outside laminae forming part of the valving surface. In Figure 1, 2 represents the valving surface; 7 represents the innermost laminae and reinforces the rest of the laminae; 12 represents the laminae in general.

In assembling the laminae, the split in the collars are staggered apart far enough so as not to allow any leakage in the laminae.

I am thus enabled to produce a valve which is slightly resilient in the vicinity of contacting surface, yet which is for the most part rigid. While I have illustrated and described with particularity only a single preferred form of my invention, with slight modification, I do not desire to be limited to the exact structural details thus illustrated and described; but intend to cover all forms and arrangements which come within the terms employed in the definitions of my invention constituting the appended claims.

I claim:

1. A valve head having an annular recess under the periphery of said head, a plurality of collars having angular portions received in said recess, the outer ends of said collars forming a slightly resilient valve surface, and a retaining ring located in said recess and cooperating with the angular portions of said collars to retain the collars in the valve head.

2. A valve head having an annular recess under the periphery of said head, a plurality of split collars having angular portions received in said recess, the outer ends of said collars forming a slightly resilient valve surface, and a retaining ring located in said recess and cooperating with the angular portions of said collars to retain the collars in the valve head.

3. A valve head for an internal combustion engine, said valve head having an annular recess under the periphery of said head, and further provided with an inturned flange, a plurality of collars having angular portions received in said recess, the outer ends of said collars forming a slightly resilient valve surface, said flange upon the valve heat inturned for retaining the collars therein.

4. A valve head for an internal combustion engine, said valve head having a space therein, heat resistant material within said space, a cap for said valve for retaining the heat resistant material in said space in the valve head, said cap formed with streamline contours, said valve head having an annular recess under the periphery of said head and further provided with an inturned flange, a plurality of split collars having angular portions received in said recess, the outer ends of the collars forming a slightly resilient valve surface, a retaining ring located in the recess and cooperating with the angular portions of said collars to retain said collars in the valve head, said flange upon the valve head inturned for holding said retaining ring in place.

ROY WILLIAM MYERS.